United States Patent

Wells

[15] 3,693,277
[45] Sept. 26, 1972

[54] LURE-RETRIEVER

[72] Inventor: Wallace N. Wells, 7415 Hollingsworth Dr., New Augusta, Ind. 46268

[22] Filed: Nov. 10, 1969

[21] Appl. No.: 875,056

[52] U.S. Cl. .................................................43/17.2
[51] Int. Cl. ..............................................A01k 97/00
[58] Field of Search........................................43/17.2

[56] References Cited

UNITED STATES PATENTS

| 3,039,223 | 6/1962 | Pavek | 43/17.2 |
| 2,662,328 | 12/1953 | Ovler | 43/17.2 |
| 892,730 | 7/1908 | Immell | 43/17.2 |
| 3,461,597 | 8/1969 | Hobson | 43/43.14 |

FOREIGN PATENTS OR APPLICATIONS

| 657,037 | 2/1963 | Canada | 43/17.2 |

Primary Examiner—Samuel Koren
Assistant Examiner—Daniel J. Leach
Attorney—Robert A. Spray

[57] ABSTRACT

A fish lure retriever, readily attachable onto an extended fishing line having its lure snagged or caught by some underwater obstruction. The retriever has an opening through which the fishing line extends and also through which a portion of the snagged lure is received, permitting the lure-retrieving force to be applied against those received lure portions. Thus, the fishing line, which guides the retriever to the submerged lure, also automatically directs and guides the retriever to a position in which a portion of the retriever is latched or locked onto a portion of the lure.

The concepts of the present invention provide a convenient, handy, and extremely useful means for retrieving a fishing plug or lure which has somehow become snagged or entangled.

4 Claims, 7 Drawing Figures

PATENTED SEP 26 1972 3,693,277
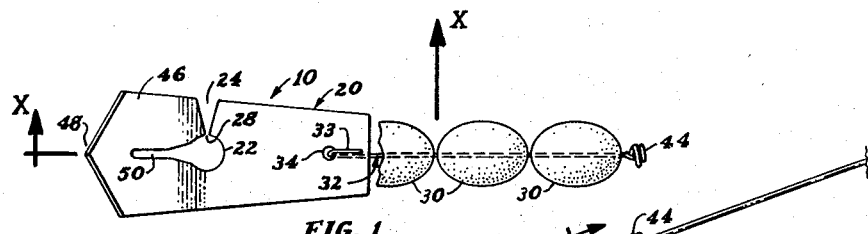
FIG. 1
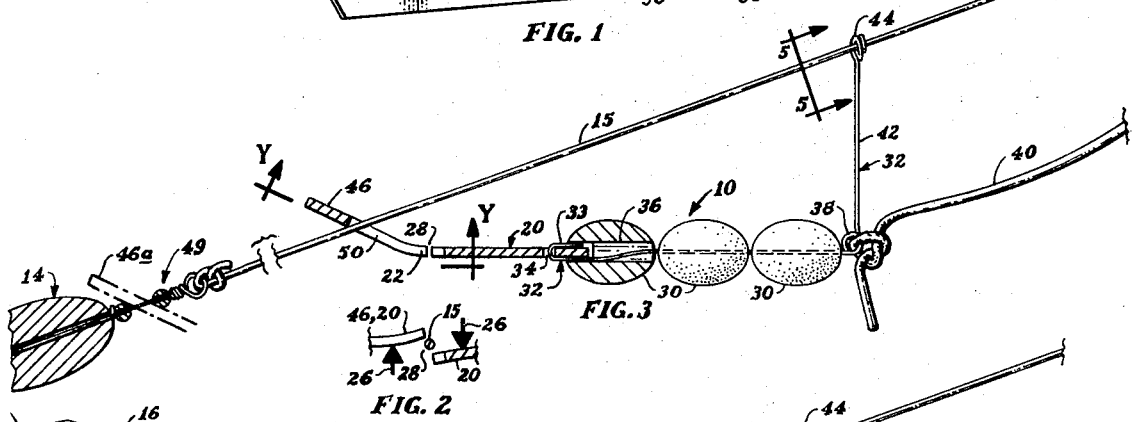
FIG. 2
FIG. 3
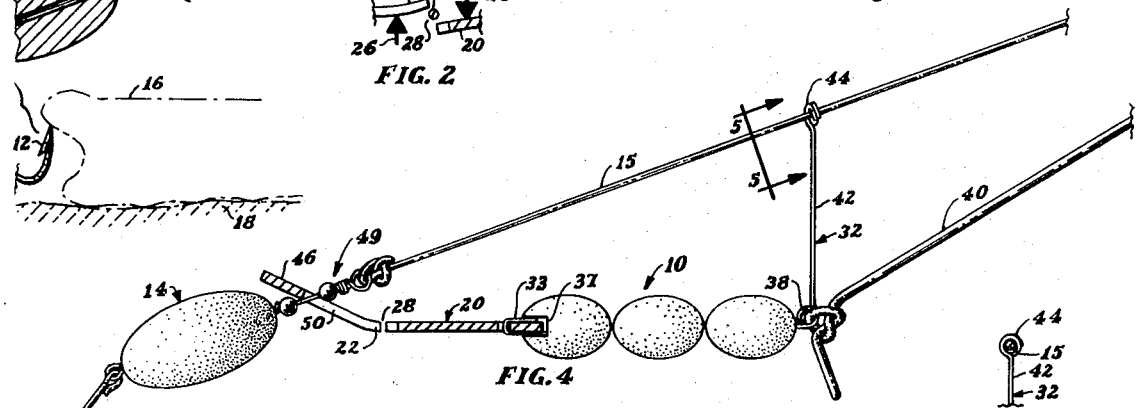
FIG. 4
FIG. 5
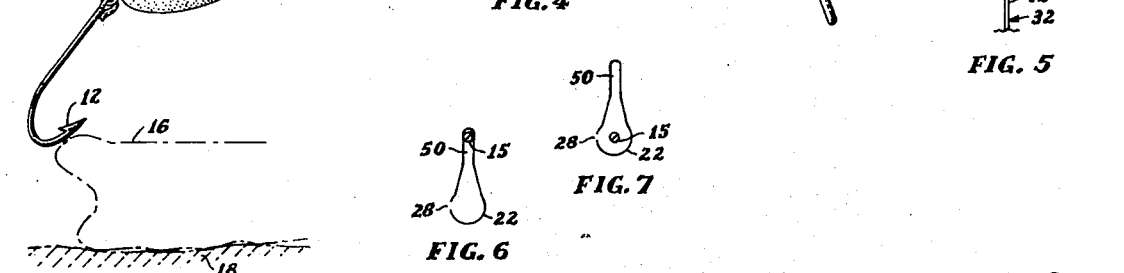
FIG. 6
FIG. 7
WALLACE N. WELLS,
INVENTOR.
BY Robert A. Spray
ATTORNEY

LURE-RETRIEVER

The value of any certain fish plug or lure is, in many situations, much higher than merely the cost of such a lure. Whether that relatively high value in a particular situation is real or imaginary to the fisherman, it nevertheless is a reason making the saving of an entangled lure very worthwhile.

For example, a fisherman will often have only one or a relatively very few of any certain type lure in his tackle box on any single occasion, for he usually feels he should have a variety of types for optional or selective use depending upon how the fishing conditions seem to be.

Also, certain individual lures have a special real or imaginary particular value or favoritism to a fisherman.

Lures of a certain type, which happen on a particular occasion to be the type upon which fish are then biting, are particularly valuable upon that occasion.

Much fishing is desirably done adjacent the bottom of the water being fished; and it is along the bottom that much of the underwater obstructions are encountered. Moreover, fishing is often felt to be the best adjacent obstructions, where fish seem to like to hide. These factors illustrate the fact that particularly desirable fishing situations are precisely the type of fishing situations in which entangling or catching of a fish lure is apparently an inevitable and inherent disadvantage and trouble.

Often, the fishing is being done at a relatively remote or long distance from any store or camp from which additional lures or line may be obtained.

Similarly, fishing is often done in particularly short or limited-duration periods, either because of the limitations of the fisherman's time as for example upon a limited vacation, or because the fish are upon that occasion only particularly likely to strike or hit for a relatively short period.

The lures and line of a fisherman, even though their cost at a retail store is not insignificant, have often a value far in excess of their retail cost. And, likewise, the avoidance of wastage of the fisherman's time in disengaging a caught lure, or re-threading or rigging of a fishing line, or other factors related to again getting set for fishing after a lure gets caught or entangled, is particularly desired.

Certain fishing situations having relatively more commercial aspects than is usually considered to be the situation of sport fishing (such relatively commercialized situations as for example where guides or charter boats or fishing parties are commercially arranged or furnished) illustrate even more desire to save particular lures, lines, and to save time, and to facilitate the fishing action in contrast to any non-fishing drudgery; and thus these situations additionally illustrate the useful worthwhileness of conveniently and handily retrieving a caught fish lure.

Concepts of the present invention provide a retriever which is particularly easy to use, and which is easy to carry in a tackle box or on a boat seat or other location, without entanglement with other fishing gear or hooks.

In using the retriever according to the invention, a practically unlimited retrieving force may be applied to a caught lure; for the retriever line utilized with the retriever may be very considerably stronger and heavier than the line which would be desirable used as a fishing line, and the lure-retrieving force is automatically applied to a strong part of the lure, with a solid or sufficient abutment against the lure to assure that the retriever will not merely slip off the lure.

Accordingly, a lure-retrieving force may be applied sufficiently strong as to bend the lure hook or tear it completely off the lure, if necessary; in any event, the lure itself may be pulled free in most any or all lure-caught situation encountered (that is, for example, where the lure is caught by one of its hooks being caught on a submerged obstacle, in contrast to what would be an unusual situation of the lure body itself having become wedged into some obstacle).

A significantly particular concept of the present invention is that the opening through which the fishing line extends is itself an opening which receives a portion of the fish lure when the retriever arrives at the submerged lure. Thus the fishing line, which guides the retriever to the lure, also automatically guides the retriever onto a latched position with respect to the lure, thereby instantly and automatically assuring that a retrieving yank on the retriever will be transmitted to the caught lure itself.

These and other concepts and features of the present invention are set forth in more detail in the following description of an embodiment which is illustrative of the inventive concepts, taken in conjunction with the accompanying drawings. The drawings are somewhat diagrammatic and schematic, and certain thicknesses are exaggerated for illustrative presentation, and portions of views are shown as broken away to illustrate interior details and to conform to the drawing size limitations; and, in the drawings:

FIG. 1 is a plan view of a retriever according to the illustrative embodiment;

FIG. 2 is a fragmental cross-sectional detail view of the retriever, taken generally on a portion of view-line X—X of FIG. 1, and showing a resilient bend being manually applied to a body member of the retriever, in the step of applying it to an associated fishing line having a snagged lure;

FIG. 3 is an elevational view of the retriever, a portion shown in cross-section taken generally as indicated by view-line X—X of FIG. 1, and with the retriever shown as applied onto a fishing line, and showing a snagged lure on the fishing line;

FIG. 4 is a view of the retriever and associated fishing line, similar to FIG. 3, but in the step of applying a lure-retrieving force to the retriever, and thus to the snagged lure;

FIG. 5 is a fragmental detail view of one of the line-receiving portions of the retriever, as indicated generally by the view-line 5—5 of FIGS. 3 and 4; and FIGS. 6 and 7, respectively, are fragmental detail illustrations showing the relative position of the retriever and the associated fishing line at different stages of the use of the retriever, these views being taken generally as indicated by the viewline Y—Y of FIG. 3.

The retriever 10 is illustrated in its advantageous use of unsnagging or freeing the hook 12 of a fishing lure or plug 14, on a fishing line 15, from an underwater obstruction or object schematically shown by the object body 16 disposed along the stream bottom or lake bed 18. (For brevity, the construction concepts and features of the retriever 10 will be described in conjunction with a description of such use.)

As shown in the drawings, the lure retriever 10 has a generally flat body member 20 having a hole or opening 22 which is open to an edge of the body 20, as shown by the notch 24, shown of a general V-shape.

The notch 24 is a line-admission slot, and permits the user to force the fishing line 15 into the body hole 22 without threading an end of the line 15 through the hole 22 (the user resiliently deforming the body 20, by manual pressure indicated by the arrows 26, shown in FIG. 2, to the extent necessary to accommodate passage of the fishing line 15 through the throat 28 of the notch 24); but the portion of the notch 24 touching the hole 22 is of a very small throat 28 width, to assure that the fishing line 15 will not inadvertently move out of the hole 22 during use, explained herein.

The body hole 22 is relatively near one end (the left end as shown) of the overall retriever 10; and the other end (right, as shown) of the retriever 10 is shown as provided with weights 30 having hollow bores and carried on a relatively stiff wire 32 which passes through the bore of each weight 30.

The carrier wire 32 is shown secured to the retriever 10 by passing its end 33 through a small hole 34 in the body member 20, then being bent back and into the hollow bore 36 of the adjacent weight body 30 through which the wire 32 is passed, the wire-end 33 being frictionally held or jammed between the adjacent surfaces of the retriever body member 20 and the weight-bore 36.

The weight 30 adjacent the body 20 is provided with a slot 37 (FIG. 4) which accommodates the rear (right) end of the body 20, and thus the weight 30 serves, in the nature of a splint, to supportingly re-inforce the wire 32 at its junction with the body 20.

Immediately outwardly (to the right as shown) of the weight bodies 30, the wire is shown bent into a full or closed loop 38. This loop 38 provides several functions: it provides an abutment which holds the weights 30 in place, and provides a resilient deflection accommodation of forces which might bend the wire 32, and also provides a place for the tying or securing of a heavy or strong retriever line 40 (a "100 lb. test" line, for example) to the retriever 10; and from the loop 38, the wire 32 extends upwardly, providing a spacer 42. (The operativity of these details is explained hereinafter.)

Atop the spacer 42, the wire 32 is formed into a spiral or loop 44, which is a full or closed loop although the wire turns are not necessarily tight or closed; and the open eye of the loop 44 is large enough (FIG. 5) to freely accommodate the fishing line 15, and the resilience or flexibility of the wire 32 is sufficient that the loop-portions of the loop 44 may be manually sprung apart sufficiently to enable the user to work the line 15 into the eye of loop 44 without threading an end of the line 15 through the eye.

It will be noted that the retriever 10 is free from hooks or other easily entangling or sharp or other objectionable or inconvenient features; and thus it is convenient to carry in the user's tackle box without much likelihood of being entangled with hooks or line in the tackle box, or even out on a boat seat or in other locations of convenient access. Moreover, its said relative freedom from entangling obstructions provides that it has low likelihood of itself getting entangled with obstructions in use.

In use, assume that a hook 12 of the lure or plug 14 on line 15 is entangled on or otherwise snagged or caught by an underwater obstruction 16, as in FIG. 3. Without a means of freeing the hook 12, the lure or plug 14 will be forever lost, together with a length of line 15; for the remote and submerged position of the snagged lure 14 means that if the line 15 is to be broken in dispair of retrieving the snagged lure 14, the line 15 may break far from the lure 14 and thus a long length of line 15 will be lost along with the lost lure 14. These and other factors have been discussed and explained in the introduction of this specification.

However, having a retriever 10, the user merely does as follows:

He forces a portion of the fishing line 15 through the admission slot 24, and forces another portion of the fishing line 15 into the eye of the loop 44, to position the retriever 10 onto the fishing line 15, as shown in FIG. 3, with the end of the retriever body 20 which has the body-hole 22 (the left end as shown) directed downwardly, that is toward the snagged or entangled lure 14. Both the body-hole 22 with its notch 24 and the loop 44 provide attachment means, movably securing the retriever 10 to the fishing line 15, while the line 15 is already played out or extended in its fishing use; thus the retriever 10 need not be applied or affixed onto the fishing line 15 unless and until there is a lure-snagged situation which requires the use of the lure retriever 10.

The retriever line 40 is then loosely played out (although of course its upper end is held, even though in a slack manner) as the retriever 10 slides downwardly (leftwardly, FIG. 3) along the fishing line 15 in the retriever's descent to the entangled lure 14. (It may be desirable for the user to move his fishing pole or rod (not shown) up and down and/or side to side to assist the retriever 10 in its descent, to clear underwater obstructions.)

In the downward descent of the retriever 10, the leading (left as shown) end of the body 20, which is inclined or upcurved as shown by the upturned end 46, guides or cams the body 20 over obstructions over which the line 15 may lie; and the pointed end 48 of that leading end 46 helps the body 20, in its travel, to push aside weeds or the like as may be encountered.

The weights 30 cause the retriever 10 to move rapidly toward the snagged lure 14; and their off-center disposition (with respect to the fishing line 15 along which the retriever is travelling), plus the height of the spacer 42, prevent the current or other factors from causing an undesired swivelling of the retriever 10 around the line 15, which would wrap the retriever line 40 around the fishing line 15 and impose a motion-retarding friction.

Upon arrival at the snagged lure 14, the upwardly formed inclination of the nose 46 of the body 20, plus the moving inertia of the retriever 10, and plus also the elongated extent (now to be described) of the body-opening 22, cause and permit the retriever 10 to move forcefully against the lure-portions 49 facing the fishing line 15, and cause and permit the body 20 to be cammed by such lure-portion 49 upwardly relatively to the fishing line 15.

This slight camming or deflecting of the body 20 lifts it relatively to the fishing line 15, upwardly out of a position (FIGS. 3 and 6) in which the fishing line 15 is disposed in a leading (leftwardly directed) relatively narrow slot or recess 50 which extends from the body-hole 22, into a relatively raised position (see FIG. 7, particularly in comparison to FIG. 6) in which the fishing line 15 is generally aligned with the center of body-hole 22, an opening much relatively larger than the slot 50. The line 15 thus aligned in the larger hole 22, the further descending travel of the retriever 10 causes the body 20 to move past the upwardly facing portions 49 of the snagged lure 14, the body-opening 22 receiving or accommodating those portions 49, and permitting the retriever 10 to go to a position such as shown by the chain-lines 46a of FIG. 3. A tug or like sensation would be usually felt through the fishing line 15 as the retriever 10 thus strikes the lure 14, the aforesaid camming and bottoming of the retriever 10 against the snagged lure 14 being practically instantaneous.

(The lure portions 49 which are upwardly facing, or attached to the fishing line 15, and which thus are the lure-portions involved in the aforesaid camming and which subsequently provide the lure-portions which are pulled during the subsequent retrieving operation, are, in a common type fish lure, the line-connectors such as a snap swivel components or other relatively small but sufficiently strong portions of the lure 14 to accept and transmit the retrieving force and operation now described.)

After the retriever 10 has moved to the retrieving position indicated by the chain lines 46a of FIG. 3, the user yanks or pulls on the retrieving line 40. This pulling force is transmitted through the wire loop 38 and the wire 32 to the retriever body member 20; and if the retriever body 20 has not already relatively dropped into its FIG. 6 position in contrast to its FIG. 7 position, the retrieving pull by line 40 onto the body 20 pulls or forces the retriever body 20 into the FIG. 6 position, in which the walls of the portion 46 of body 20 adjacent the slot 50 abut or bear against the upwardly disposed lure-portions 49.

Then, continued yanking or pulling upwardly on the retriever line 40 (FIG. 4) applies a lure-retrieving pull on the snagged lure 14 and its hook or hooks 12, by force transmitted through those lure-portions 49. The lure-retrieving force may and can be sufficiently strong as required to somehow dislodge or even bend the hook 12 or even break the hook 12 or its connection to the lure; for the retriever line 40 can be relatively very heavy in contrast to the usual fishing or casting line used.

Once the lure 14 is dislodged, the line 15 and the line 40 are both desirably pulled fully in, and the retriever 10 is conveniently removed from line 15 by a reverse of retriever-applying steps described above. If the hook 12 or its connection to the lure 14 is not significantly damaged, the lure 14 may then of course be immediately re-used. The fishing line 15 will in most circumstances not have been damaged at all.

Obviously, the portions 49 of the lure 14, which are graspable by the body 20 walls adjacent the slot 50, must include portions which are relatively larger than lure portions further downward toward the major portion of the lure body 14, to permit the retriever body portion 46 and its slot 50 to latch onto or lock in behind such lure portions 49 to permit the application of the lure-retrieving force.

It will be understood that the components of the retriever will be formed from suitable material particularly suitable for the intended purpose. Thus the body member will be of suitable rust-proof or plated sheet stock or other material, and the material of the body member 20 and of the carrier wire 32 will be sufficiently flexible to permit the line 15 to be positioned into the openings 22 and 44.

It is seen that a lure retriever according to the inventive concepts provides novel and advantageous concepts and features which co-operate to provide the advantages of handiness, convenience, quickness of application to an extended fishing line and of latching onto and retrieving a snagged lure, economy of saving of a snagged lure and of associated line, providing as an ultimate goal a greatly magnified advantage of the lure-saving and line-saving when considering especially the practical realities and desirabilities of many fishing situations as illustratively discussed above, ease of storage of the retriever when not in use, and advantages of using the fishing line to both direct the retriever to the snagged lure and to automatically direct the retriever into a latched or locking position with respect to portions of the snagged lure.

Accordingly, it will be seen from the foregoing description of the invention according to the illustrative embodiment, considered with the accompanying drawings, that the present invention provides a new and useful device having desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific form or arrangement of parts herein described or shown. Terms of the specification and claims are used in their broad sense, so far as consistent with the inventive concepts; for illustration, the retrieving-force transmitting portions 49 of the lure 14 are not at all necessarily portions of the fish-attracting lure body itself, but are portions of the lure in the sense here significant, that is they are relatively strong and relatively large in comparison to portions of the fishing line 15 itself.

What is claimed is:

1. A retriever for retrieving a fish lure attached to a fishing line, said retriever comprising:
 a body member;
 means for movably attaching said body member to said fishing line including an opening through said body member, a first slot extending from said opening to a side edge thereof, the said fishing line extending through said opening after being passed through said first slot into said opening, the body member being relatively freely slidable on said fishing line;
 said first slot being provided with a throat narrower than the thickness of said fishing line, said throat being manually openable to permit said line to pass therethrough into said opening;
 said opening being sufficiently large as to accommodate the reception therethrough of a portion of the fish lure connected to said line;
 a second slot extending longitudinally from said opening having a lesser width than the said lure portion, the side edges of the second slot abuttingly engaging the said lure portion after said lure portion is passed through said opening;

weight means attached to the rear end of said body member, substantially rigid support means extending from the rearward end of the weight means and movable engaging the fishing line to retain the said rear end spaced therefrom, said support means providing means rearwardly of said weight means for securing a retriever line thereto;

said body member being movable along the fishing line to permit said lure portion to pass through said opening and to be engaged by the edges of the second slot, whereby a pull on the retriever line will free the snagged lure.

2. A retriever as set forth in claim 1 in which the center of gravity is closer to said support means than to the said opening.

3. A retriever as set forth in claim 1 in which said body member is generally flat, the forward end of which is upwardly inclined with said second slot being positioned within said forward end, and said forward end being pointed to deflect weeds or the like.

4. A retriever as set forth in claim 1 in which the edges of said throat are manually resiliently deformable to enlarge the opening through said throat.

* * * * *